F. B. COMINS.
EMERGENCY TRACTION DEVICE.
APPLICATION FILED MAR. 11, 1912.
1,046,272.
Patented Dec. 3, 1912.
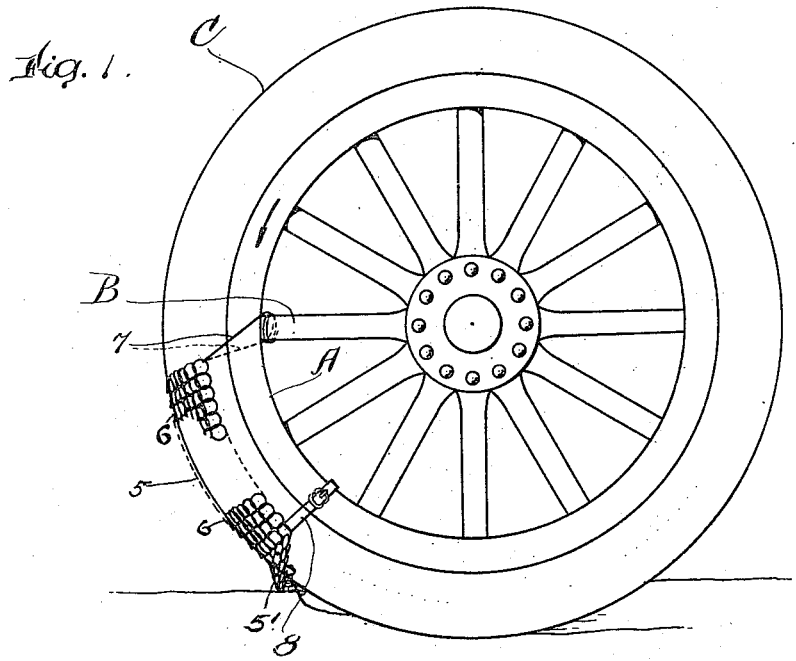
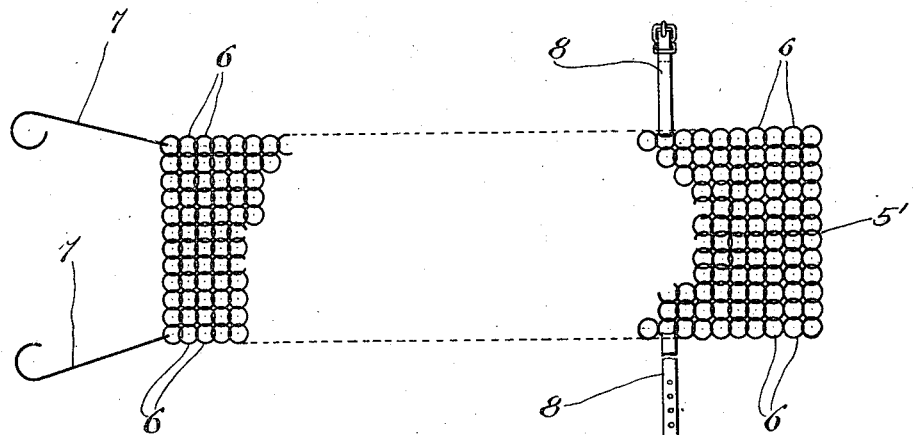

UNITED STATES PATENT OFFICE.

FRANK B. COMINS, OF SHARON, MASSACHUSETTS.

EMERGENCY TRACTION DEVICE.

1,046,272.  Specification of Letters Patent.  Patented Dec. 3, 1912.

Application filed March 11, 1912. Serial No. 683,062.

*To all whom it may concern:*

Be it known that I, FRANK B. COMINS, of Sharon, in the county of Norfolk and State of Massachusetts, have invented a new and Improved Emergency Traction Device, of which the following is a specification, reference being had to the accompanying drawings, forming part thereof.

This invention has reference to improvements in traction devices for wheels, and particularly to such devices applicable to the wheel tires of automobiles.

One object of this invention is to so construct a traction device for a pneumatic tire that such device may be conveniently attached to or detached from a wheel provided with such tire; that the traction device may yield and follow or accommodate itself to the undulation of the tire; and that the traction device may, at some point in the rotation of the wheel, be wholly removed from contact with the roadway.

Other objects of the invention will appear from the following description.

The invention consists in the traction device or mat hereinafter described and claimed.

Figure 1. represents a side elevation of portions of a wheel having a pneumatic tire, and illustrating the application thereto of the improved traction device or mat. Fig. 2. represents a plan view of the improved traction mat.

Similar numbers of reference designate corresponding parts throughout.

In carrying this invention into practice it has been my object to provide an emergency traction device adapted for use on a wheel having a pneumatic tire, and of such nature or construction that, where said wheel becomes stalled in such a manner that the entire periphery of its tire is not accessible, the traction device may be secured to an accessible portion of the wheel and a portion of the traction device tucked between the tire and the roadway whereby this loose portion of the traction device by the rotation of the wheel, will be carried under the wheel and into engagement with the underlying roadway. In order to facilitate the traction engagement between the traction device and the roadway, and particularly where such roadway comprises pockets or other depressions containing sand or mud, it is found that the traction device should be so flexible as to accommodate itself to the undulations of the tire sheath or shoe and that the traction device should extend continuously for a sufficient length to afford a continuous engagement with the roadway during a substantial part of the rotation of the wheel.

As shown in the drawings A represents a wheel having the spokes B, B and provided with a pneumatic tire of which C represents the sheath or shoe.

The improved traction device consists of a mat of traction material indicated as a whole at 5, and comprising a series of links 6, 6 interengaged to form a continuously extending fabric, and having at one end the hooks 7 and, preferably, at its sides securing straps or members 8, 8 by means which the mat 5 may be secured over the periphery of the sheath C, and secured thereon at a point intermediate its length by the engagement of its straps or members 8, 8 with certain of the spokes B, B of the wheel A, leaving the loose or free end 5'. The shape and the size of the links 6, 6 and the general construction of the mat 5 depends largely upon the nature of the vehicle to the wheel or wheels of which the traction mats are intended to be attached, and to the inclination of the user.

This improved traction device or mat is adapted primarily for use in the emergency that the lower portion of the wheel becomes stalled in a depression of the roadway usually containing mud, sand or other material in which the periphery of the tire cannot engage sufficiently with the material of the roadway to effect traction thereover or where the end of said depression or pocket forming the fulcrum is so abrupt that the engagement of the tire therewith is not sufficient to withstand the lifting leverage of the wheel. In such case the mat 5 is hooked on to the upper exposed front portion of the wheel, as indicated in Fig. 1 and said mat extends downward and partially around the tire and secured by means of the straps or securing means 8, 8 which are passed around the spokes B, B, while the free lower end is tucked betwen the tire and the roadway. Power is now applied to the wheel to effect its rotation and said wheel may now advance for a short distance over said free portion 5' of the mat 5, after which the traction device or mat 5 is carried around the wheel and may then be removed therefrom.

It is to be understood that the present device is not adapted or intended for constant use as an anti skid traction device and I distinguish this invention from an anti skid device or ordinary traction devices particularly in that such devices are constructed to be applied to the entire circumference of the wheel tire or that the action of portions of the traction members is relative to other portions thereof at the opposite portion of the wheel's circumference while the present device is restricted as to its length to a length not greater, and preferably less, than one half the circumference of the wheel tire so that the device can be secured to the exposed portion of a wheel tire when a comparatively large extent of such tire is inaccessible.

Having thus described my invention I claim as new and desire to secure by Letters Patent.

1. An emergency traction device for wheels comprising a flexible mat having means for securing and stretching a lengthwise portion thereof against the wheel tread, one of said securing means being located at a point distant from the end of said mat whereby such end portion may hang free of the wheel.

2. An emergency traction device for wheels comprising a mat formed of chain links having at one end a pair of securing hooks and at the sides, at points distant from the other end, a pair of complemental securing straps one of which has a buckle, substantially as described.

FRANK B. COMINS.

Witnesses:
CHARLES B. CUMMINGS,
HENRY J. MILLER.

---

Copies of this patent may be obtained for five cents each, by addressing the "Commissioner of Patents, Washington, D. C."